United States Patent
Dick et al.

(10) Patent No.: US 7,093,464 B2
(45) Date of Patent: Aug. 22, 2006

(54) DEVICE FOR SUPPORTING A HORIZONTAL GUIDED GLASS STRAND

(75) Inventors: Erhard Dick, Pechbrunn (DE); Erich Fischer, Mitterteich (DE); Roland Fuchs, Leonberg (DE); Markus Riedel, Mitterteich (DE); Ulrich Lange, Mainz (DE); Andreas Langsdorf, Ingelheim (DE); Christian Kunert, Mainz (DE)

(73) Assignee: Schott AG, Mainz (DE)

( * ) Notice: Subject to any disclaimer, the term of this patent is extended or adjusted under 35 U.S.C. 154(b) by 261 days.

(21) Appl. No.: 10/101,158

(22) Filed: Mar. 19, 2002

(65) Prior Publication Data

US 2002/0184922 A1    Dec. 12, 2002

(30) Foreign Application Priority Data

Mar. 20, 2001 (DE) .................. 101 13 344

(51) Int. Cl.
*C03B 35/26* (2006.01)
(52) U.S. Cl. ................. 65/25.1; 65/182.1; 65/182.2
(58) Field of Classification Search ........... 65/25.1, 65/182.1, 182.2, 304, 305; 226/97, 97.3; 406/88, 89, 91
See application file for complete search history.

(56) References Cited

U.S. PATENT DOCUMENTS

| 1,638,593 | A | * | 8/1927 | Mulholland ............... 65/25.1 |
| 2,678,237 | A | * | 5/1954 | Allander et al. .............. 406/88 |
| 2,805,898 | A | * | 9/1957 | Willis, Jr. .................... 406/88 |
| 3,254,981 | A | * | 6/1966 | Havens ........................ 65/359 |
| 3,961,927 | A | * | 6/1976 | Alderson et al. ............ 65/25.1 |
| 4,312,659 | A |   | 1/1982 | Panarello et al. |
| 4,546,811 | A | * | 10/1985 | Potard ....................... 164/66.1 |
| 4,636,239 | A | * | 1/1987 | Wilson et al. ................ 65/109 |
| 5,688,300 | A | * | 11/1997 | Ashley et al. ................. 65/86 |
| 5,766,298 | A | * | 6/1998 | Ashley et al. ................ 65/187 |
| 2002/0092326 | A1 | * | 7/2002 | Langsdorf et al. ......... 65/182.2 |
| 2003/0037573 | A1 | * | 2/2003 | Langsdorf et al. ........... 65/158 |

FOREIGN PATENT DOCUMENTS

| DE | 28 03 455 | 8/1979 |
| DE | 28 52 406 | 7/1980 |
| DE | 31 25 521 | 3/1982 |
| DE | 196 43 108 | 4/1998 |
| JP | 63-236718 | 10/1988 |

\* cited by examiner

*Primary Examiner*—Carlos Lopez
(74) *Attorney, Agent, or Firm*—Baker & Daniels

(57) ABSTRACT

The invention concerns a device for supporting a horizontal guided, continuous glass strand;
  with a number of supporting blocks, which each exhibits a supporting area, facing the glass strand;
  the individual supporting block in the area of the supporting area is made from a porous, gas-impermeable diaphragm body;
  the diaphragm body is connected to a source of compressed gas for conveying gas through the supporting area.

9 Claims, 2 Drawing Sheets

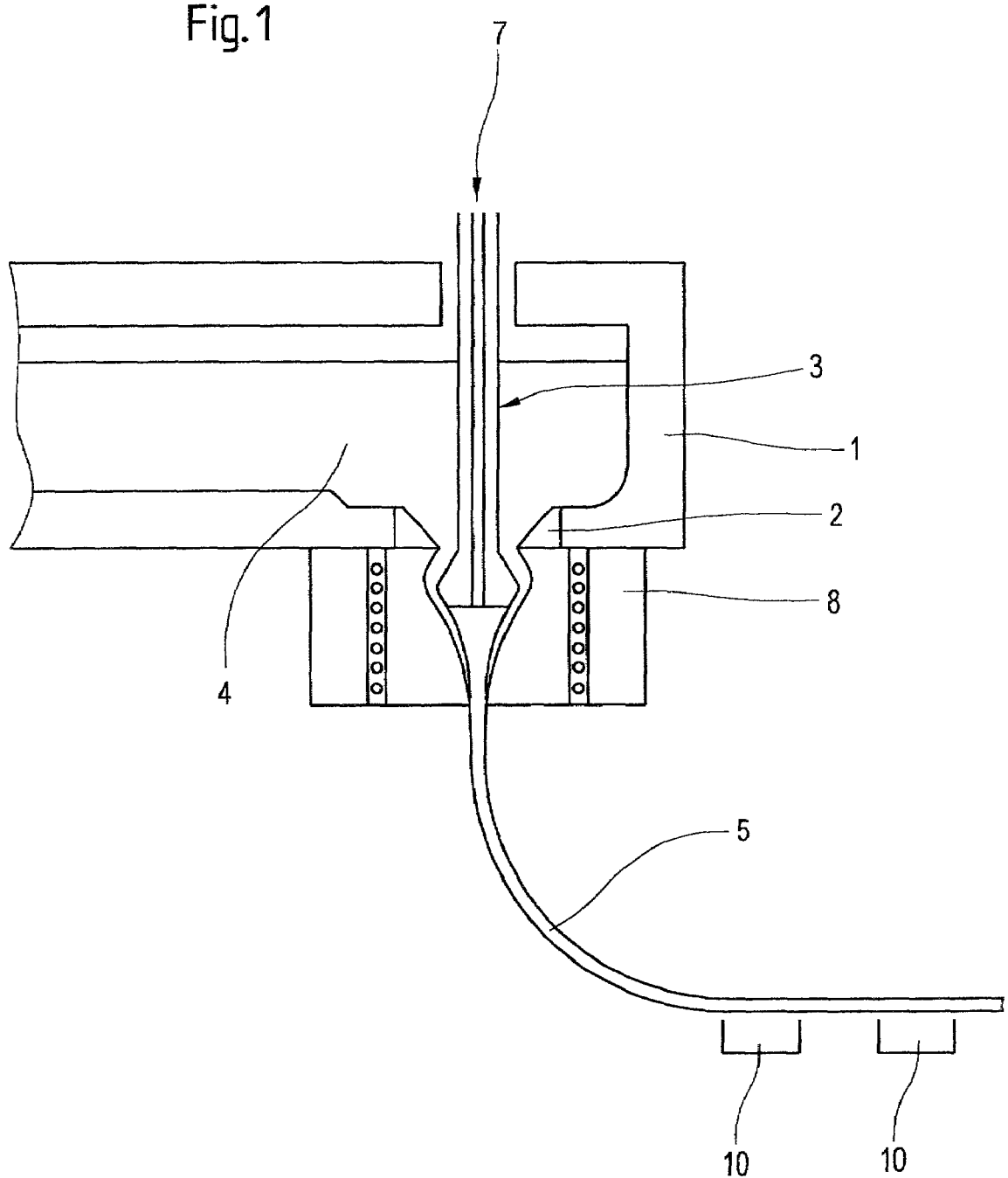

DEVICE FOR SUPPORTING A HORIZONTAL GUIDED GLASS STRAND

BACKGROUND OF THE INVENTION

The invention concerns a device for supporting a horizontal guided, continuous glass strand.

The Danner-Technique and the Vello-Technique are used for the industrial production of glass rods and glass tubes up to diameters of approximately 100 mm. With the Danner-Technique the glass flows from a nozzle on top of a rotating tilted pipe, through which, in the case of producing tubes, a glass is blown and a glass strand is pulled off continuously from the tip. With the Vello-Technique a ring nozzle, through whose center the glass is blown for the tubing production, creates the glass strand.

Tube drawing techniques have become known for example from DE 100 54 804 A1.

With the usual techniques for the production of glass rods or glass tubes, the hot and ductile glass strand is directed into the horizontal level, cooled down over the length of the drawing bench and finally separated into sections of the desired length. The glass strand, which is still hot, is supported along the drawing path. This takes place usually by means of rollers or supports from a material, which leaves fewest possible traces on the surface of the glass strand.

Wood and graphite are the materials usually used for these rollers. V-shaped blocks made from the same materials are used instead of the rollers if extremely quiet running of the glass strand is demanded within the drawing path; the recess of the V-shaped blocks guides the glass strand.

Good lateral guide properties are achieved while accepting that the strand slides on the support and that there is the danger of developing scratches.

The small supporting surface, which the rollers offer to the glass strand, causes the glass strand (especially in its hot area) to be deformed during transport over the rollers, which in return causes an impairment of its dimensional accuracy and especially problems with ovalness. Furthermore, heat is removed from the glass strand along the contact line to the rollers. The nonuniform heat distribution over the circumference of the glass strand leads with further cooling to distortion and bending of the glass strand. In addition, the contact to the rollers transfers dust and dirt on the glass strand.

The guide rollers and guide blocks are especially in the hot area subjected to distinct wear by abrasion. This abrasion creates contaminations on the glass strand surface. During the progressive wear the occurrence of the scratches created by the supporting device increases, until the rollers and blocks must be exchanged after some time.

DE 31 25 521 A1 describes a device for conveying and supporting a hot, continuous glass tube. The supporting device exhibits a V-shaped recess, which forms a supporting area for the glass tube. The supporting area exhibits drilled holes in the vertex of the V, which are connected to compressed air. Compressed air is to lift the glass tube off the supporting area. However, in the range of the legs of the V-shaped supporting area approximation of the glass tube to the walls of the legs takes place and therefore also contact.

This leads to a mutual impairment. On the one hand scratches can develop on the exterior of the glass tube, on the other hand material wear of the supporting device takes place, especially if a soft material such as graphite is used for it.

A prior art design variation is known in which the glass tube strand is guided between two walls bent against each other, which are usually made of sheet metal, and is carried on air, which discharges from the gap between the walls. Usually these devices are present only in the first few meters; rollers do the further transport of the glass strand. In such devices one tries to stabilize the glass strand centered on a gas cushion by means of suitably guiding the gas that is emerging from a gap under the glass strand. However, lateral contact of the glass strand with the walls cannot always be prevented, so that in these cases the surface of the glass strand is damaged or contaminated.

A freely floating guide of the freshly formed glass strand on compressed air nozzles would be possible. In this case no contact can occur between glass strand and firm materials. However, the necessary airflow for supporting the glass strand would be so large, that the nozzles would cause an inadmissibly high noise level. Furthermore there is the risk that the gases impacting the glass strand surface with high speeds deform the glass strand especially in its hot area. Besides, this principle is not economical due to the high costs of compressed air.

SUMMARY OF THE INVENTION

The invention is based on the task to design a device of the initially described kind in such a manner that a glass strand—solid or hollow—originating from a continuous casting unit, is horizontally guided and supported, without having contact with a firm environment, so that damage of the glass strand and/or wear of the supporting blocks are avoided, with good dimensional accuracy of the glass strand as well as with low capital investment cost and low operating cost.

The device according to invention thus creates a gas cushion for the support of the glass strand. The gas cushion is created by means of a fine-porous, gas-permeable diaphragm body, from which gas emerges in very fine distribution. This way a gas cushion can be formed, which can be created on the one hand with gas throughput, and which impinges on the blown on areas of the glass strand as symmetrically as possible.

Thus the difficulties connected with rollers or firm supports, like the local extraction of heat at support points and the risk of deformation, are eliminated. Contrary to the rollers or firm supports the carrying force will transfer over a substantially larger area to the tubing strand, which prevents the risk of deformation. Moreover, the heat dissipation from the glass strand is homogenized, since no local contact between the glass strand and the supporting device takes place. The heat dissipated by the supporting gas is removed from the glass strand over a large surface area.

An interesting variation of the invention consists of providing the diaphragm bodies with channels for passing the compressed gas and to locate the channels at a certain distance to the gas emerging area—called from now on "supporting area"—generally parallel to the supporting area. Thereby it is possible to use diaphragm bodies made from a material with relatively low strength and to design the diaphragm bodies relatively thick-walled, so that on the one hand there is no risk of fracture, and that however on the other hand the compressed gas has to cover only a short distance from the channel to the supporting area, so that the pressure of the compressed gas can be relatively low.

BRIEF DESCRIPTION OF THE DRAWINGS

The invention is described in more detail with the help of the drawings.

FIG. 1 shows schematically a continuous casting unit of the Vello principle.

DETAILED DESCRIPTION

Figure 3:
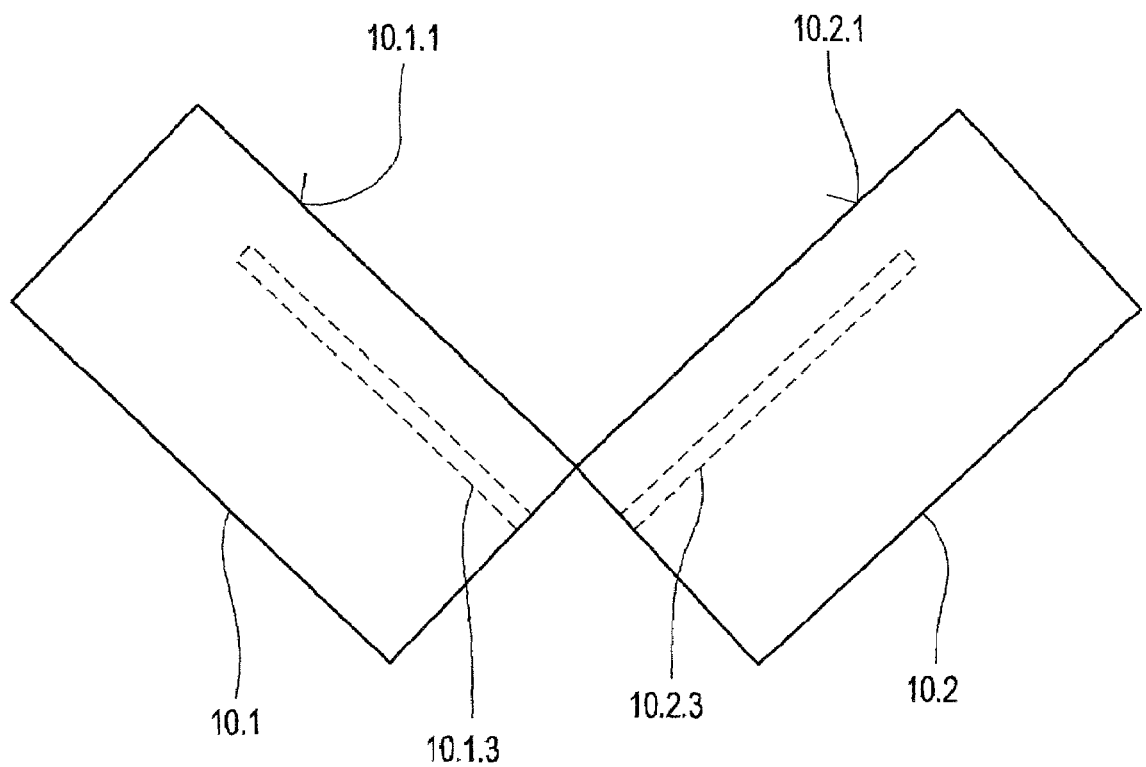
FIG. 3 shows a second design variation of a supporting block.

The device represented in FIG. 1 exhibits a feeding head 1. At the base of the feeding head 1 sits a discharge ring 2. Centered in this ring is the tube-drawing needle 3. The needle consists of a long shank, whose lower end is extended downwards conically. This cone, the pinhead, is scarcely below the discharge ring. The needle shank is hollow for guiding the gas atmosphere 7 (drilled hole), so that the gas atmosphere can be blown through. The needle can be traversed in horizontal and vertical directions.

The molten glass mass 4 flows through the annular gap between needle 3 and ring 2 and expands over the conical pinhead. From the edge of the pinhead, the tear-off edge, it flows downwards and forms into a bulb. The created hollow strand 5 is bent in the horizontal direction before solidifying while hanging freely and pulled off over supporting blocks 10 according to the invention with a drawing machine.

The gas pressure of the gas atmosphere 7 can be regulated, so that in connection with different drawing rates of the glass amount to be processed a broad dimensional spectrum can be manufactured.

Figure 2:
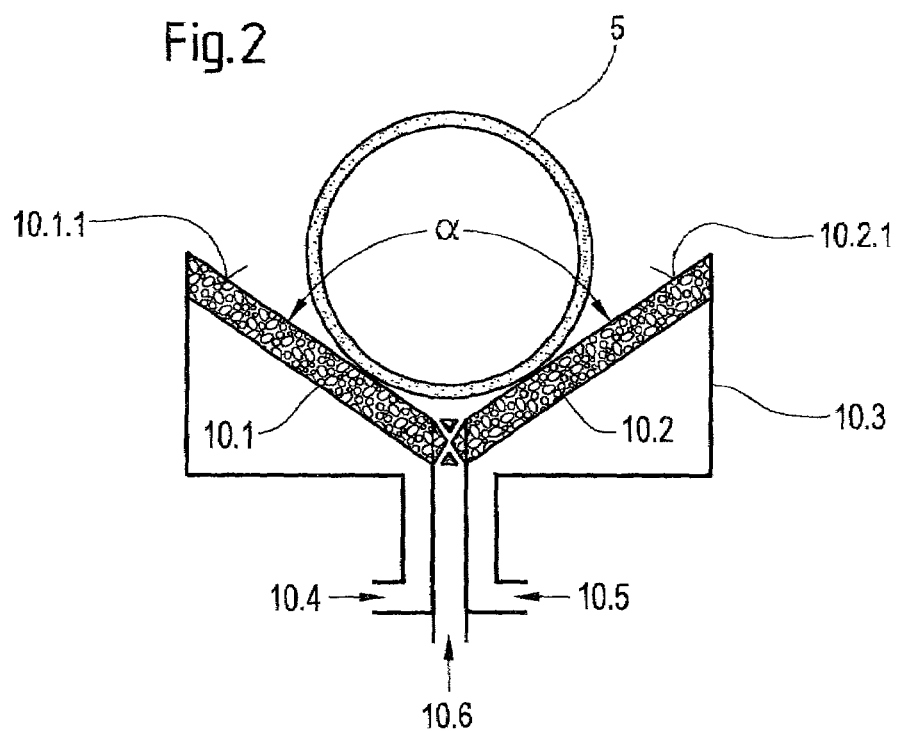
FIG. 2 shows a supporting block for a continuous casting unit in a section perpendicular to the glass strand axis.

The supporting block 10 represented more accurately in FIG. 2 carries the glass strand 5. The supporting block 10 is built as follows: there are two diaphragm bodies 10.1, 10.2. These consist of a fine-porous material, for example of carbon materials. They are built completely identical and symmetrically arranged in such a manner that they form a V with one another. The supporting block 10 can be built asymmetrically as well. As shown in FIG. 2 and in accordance with the preceding description, the apex of the V points vertically downward, that is, in the direction of gravity, during use.

Furthermore a pressure housing 10.3 is provided. It exhibits two inlets 10.4, 10.5 for compressed gas. Between the inlets 10.4, 10.5 is a further gas inlet 10.6, which can be used for passing in gas of relative low excess pressure.

The compressed gas passed into the inlets 10.4 and 10.5 passes through the pores of the diaphragm bodies 10.1, 10.2 and arrives at the supporting areas 10.1.1, 10.2.1 of the diaphragm bodies 10.1, 10.2, where it emerges. It forms a gas cushion, on which the glass strand 5 so to speak swims.

It is necessary in each case that the material of the diaphragm bodies 10.1, 10.2 is an open-porous material, so that gas from the interior of the pressure housing 10.3 can pass through to the supporting areas 10.1.1 and 10.2.1. An open-porous carbon material is preferred. It exhibits very good emergency running properties in case of the failure of the gas supply and also leaves no disturbing traces on the glass strand surface with brief contact. Beside carbon also open-porous sinter metals or metal fabrics are applicable for these parts of the device. They are used preferably in applications, in which with carbon no sufficient long time creep strength can be achieved with high temperatures.

In temperature ranges over 900° C., where even regular metals are pushed to their load limits, the use of porous ceramics such as SiC or Cordient or of porous precious metals is possible.

The angle α that the two diaphragm bodies 10.1, 10.2 form with one another, depends on the outside diameter of the glass strand 5. The arrangement can be done in such a manner that the angle α is adjustable. For glass strands with large diameter flatter angles are favorable, for thin glass strands pointed angles. Some combinations of strand diameter and angle can be taken from the following table:

Interrelationship between glass strand diameters and support angles

| Glass strand diameter | Angles |
| --- | --- |
| 3 mm | 90° |
| 12 mm | 110° |
| 30 mm | 135° |

Inlet 10.6 for gas with low excess pressure is designed in such a manner that the gas flow divides and strokes preferably along the supporting areas 10.1.1 and 10.2.1. This division of the gas flow can take place by means of bent drilled holes, recesses misaligned against each other, recesses or other things built in the gap.

Air is the first choice for gas. In addition, other gases can be used. Gas can exercise besides its supporting function a temperature equalization function, thus that it exhibits a certain temperature.

The whole device is preferably separated into individual segments. These can be arranged directly one behind another to permit a constant support of the glass strand especially in its hot area. With increasing cooling of the glass strand however it becomes more mechanically stable, so that the segments with increasing distance of the hot area can be arranged in larger distance. Thus the operating cost can be reduced compared to a continuous device.

FIG. 3 shows again two diaphragm bodies 10.1, 10.2 with its two supporting areas 10.1.1, 10.2.1. The special feature of these diaphragm bodies are channels 10.1.3, 10.2.3. The channels run parallel to the supporting areas 10.1.1, 10.2.1. Several such channels 10.1.3, 10.2.3 are arranged behind each other—in direction of the glass strand axis.

The reason for this design variation is the following:

A very brittle material with comparatively low strength can be used as diaphragm material, because the diaphragm bodies can be made very thick, so that the strength is acceptable. Nevertheless is the distance, which the compressed gas must cover through the diaphragm material until it arrives at the supporting areas, relatively short. The channels 10.1.3, 10.2.3 can be located relatively close to the supporting areas 10.1.1, 10.2/1.

As an alternative to the design variation in accordance with FIG. 3 it could be considered to create the two diaphragm bodies 10.1, 10.2 very thin and to put them on top of a rigid base. However, this design variation could be expensive and complicated.

The invention claimed is:

1. A device for supporting a horizontally guided continuous glass strand, said device comprising:

a plurality of supporting blocks each defining a supporting area facing the glass strand, said supporting block in the supporting area comprising a pair of porous, gas-permeable diaphragm bodies connected to a source of compressed gas for conveying gas through the supporting area;

said diaphragm bodies being mutually arranged in a V-shape in a section perpendicular to the glass strand axis, wherein the apex of the V points vertically downwardly in the direction of gravity during use; and an additional gas connection for passing a compressed gas against the bottom of the glass strand in the apex of the V defined by said diaphragm bodies.

2. The device according to claim 1 wherein the diaphragm body consists essentially of open-porous carbon material.

3. The device according to claim 1 wherein the diaphragm body consists essentially of open-porous ceramic material.

4. The device according to claim 1 wherein the diaphragm body consists essentially of open-porous sinter metal.

5. The device according to claim 1 connected to a continuous casting unit.

6. The device according to claim 1 wherein:

each said diaphragm body includes channels for passing compressed gas;

the channels are in the material of the diaphragm body at a distance to the supporting area.

7. The device according to claim 6, wherein the diaphragm body consists essentially of open-porous carbon material.

8. The device according to claim 6, wherein the diaphragm body consists essentially of open-porous ceramic material.

9. The device according to claim 6, wherein the diaphragm body consists essentially of open-porous sinter metal.

* * * * *